United States Patent
Kleinmann (10) Patent No.: US 8,316,020 B1
(45) Date of Patent: Nov. 20, 2012

(54) SYSTEM, METHOD, AND COMPUTER PROGRAM FOR CREATING A GROUP PROFILE BASED ON USER PROFILE ATTRIBUTES AND A RULE

(75) Inventor: Amit Kleinmann, Tel-Aviv (IL)

(73) Assignee: Amdocs Software Systems Limited, Dublin (IE)

( * ) Notice: Subject to any disclaimer, the term of this patent is extended or adjusted under 35 U.S.C. 154(b) by 507 days.

(21) Appl. No.: 12/331,142

(22) Filed: Dec. 9, 2008

(51) Int. Cl.
*G06F 17/30* (2006.01)

(52) U.S. Cl. ....................................... 707/734

(58) Field of Classification Search .................. 707/734
See application file for complete search history.

(56) References Cited

U.S. PATENT DOCUMENTS

| | | | | |
|---|---|---|---|---|
| 4,566,033 A | | 1/1986 | Reidenouer | 358/115 |
| 5,479,599 A | * | 12/1995 | Rockwell et al. | 715/837 |
| 5,973,683 A | | 10/1999 | Cragun et al. | 345/327 |
| 6,038,554 A | * | 3/2000 | Vig | 705/400 |
| 6,327,590 B1 | * | 12/2001 | Chidlovskii et al. | 707/734 |
| 6,493,702 B1 | * | 12/2002 | Adar et al. | 707/706 |
| 6,611,881 B1 | * | 8/2003 | Gottfurcht et al. | 710/18 |
| 6,836,773 B2 | * | 12/2004 | Tamayo et al. | 1/1 |
| 6,845,396 B1 | * | 1/2005 | Kanojia et al. | 709/224 |
| 6,904,408 B1 | * | 6/2005 | McCarthy et al. | 705/2 |
| 7,069,259 B2 | * | 6/2006 | Horvitz et al. | 706/25 |
| 7,206,757 B2 | * | 4/2007 | Seigel et al. | 705/26.41 |
| 7,242,988 B1 | * | 7/2007 | Hoffberg et al. | 700/28 |
| 7,330,824 B1 | * | 2/2008 | Kanojia et al. | 705/14.61 |
| 7,406,449 B2 | * | 7/2008 | Horvitz et al. | 706/14 |
| 7,426,533 B2 | * | 9/2008 | Malone et al. | 709/203 |
| 7,512,653 B2 | * | 3/2009 | Krishnasamy et al. | 709/204 |
| 7,565,157 B1 | * | 7/2009 | Ortega et al. | 455/456.2 |
| 7,627,831 B2 | * | 12/2009 | Chiu et al. | 715/767 |
| 7,668,824 B2 | * | 2/2010 | Sasaki | 707/999.006 |
| 7,831,529 B2 | * | 11/2010 | Horvitz et al. | 706/14 |
| 7,917,438 B2 | * | 3/2011 | Kenedy et al. | 705/51 |
| 7,937,655 B2 | * | 5/2011 | Teng et al. | 715/255 |
| 7,941,329 B2 | * | 5/2011 | Kenedy et al. | 705/4 |
| 7,958,196 B2 | * | 6/2011 | Malone et al. | 709/206 |
| 8,082,519 B2 | * | 12/2011 | Oron et al. | 715/788 |
| 2001/0032240 A1 | * | 10/2001 | Malone et al. | 709/203 |
| 2001/0049620 A1 | * | 12/2001 | Blasko | 705/10 |
| 2002/0129368 A1 | * | 9/2002 | Schlack et al. | 725/46 |
| 2002/0140728 A1 | | 10/2002 | Zimmerman | 345/745 |
| 2003/0050815 A1 | * | 3/2003 | Seigel et al. | 705/7 |
| 2003/0066074 A1 | | 4/2003 | Zimmerman et al. | 725/14 |
| 2003/0229900 A1 | * | 12/2003 | Reisman | 725/87 |
| 2004/0002932 A1 | * | 1/2004 | Horvitz et al. | 706/46 |
| 2004/0003392 A1 | * | 1/2004 | Trajkovic et al. | 725/10 |
| 2005/0202845 A1 | * | 9/2005 | Sasaki | 455/556.2 |
| 2005/0288954 A1 | * | 12/2005 | McCarthy et al. | 705/1 |

(Continued)

OTHER PUBLICATIONS

"Access Rights" from Microsoft Dynamics CRM 3.0. Available online at http://msdn.microsoft.com/en-us/library/aa679989.aspx. Copyright 2007.*

*Primary Examiner* — Mark Andrew X Radtke (74) *Attorney, Agent, or Firm* — Zilka-Kotab, PC (57) ABSTRACT

A system, method, and computer program product are provided for creating a group profile based on user profile attributes and a rule. In use, a plurality of user profiles is identified. Furthermore, a group profile is created based on attributes of the user profiles and at least one rule.

21 Claims, 4 Drawing Sheets

U.S. PATENT DOCUMENTS

| | | | |
|---|---|---|---|
| 2006/0020973 A1 | 1/2006 | Hannum et al. | 725/46 |
| 2006/0031288 A1* | 2/2006 | Ter Horst et al. | 709/204 |
| 2006/0206573 A1* | 9/2006 | Horvitz et al. | 709/206 |
| 2006/0218153 A1* | 9/2006 | Voon et al. | 707/10 |
| 2006/0218225 A1* | 9/2006 | Hee Voon et al. | 709/201 |
| 2006/0258463 A1* | 11/2006 | Cugno et al. | 463/42 |
| 2007/0038516 A1* | 2/2007 | Apple et al. | 705/14 |
| 2007/0073585 A1* | 3/2007 | Apple et al. | 705/14 |
| 2007/0174477 A1* | 7/2007 | Bostick et al. | 709/231 |
| 2007/0240183 A1* | 10/2007 | Garbow et al. | 725/38 |
| 2007/0287473 A1* | 12/2007 | Dupray | 455/456.1 |
| 2007/0294127 A1* | 12/2007 | Zivov | 705/10 |
| 2008/0183827 A1* | 7/2008 | Rege et al. | 709/206 |
| 2008/0222085 A1* | 9/2008 | Bostick et al. | 707/1 |
| 2008/0227063 A1* | 9/2008 | Kenedy et al. | 434/219 |
| 2008/0228043 A1* | 9/2008 | Kenedy et al. | 600/300 |
| 2008/0228531 A1* | 9/2008 | Kenedy et al. | 705/4 |
| 2008/0228708 A1* | 9/2008 | Kenedy et al. | 707/2 |
| 2008/0228735 A1* | 9/2008 | Kenedy et al. | 707/3 |
| 2008/0228767 A1* | 9/2008 | Kenedy et al. | 707/6 |
| 2008/0228768 A1* | 9/2008 | Kenedy et al. | 707/6 |
| 2008/0228824 A1* | 9/2008 | Kenedy et al. | 707/104.1 |
| 2008/0255944 A1* | 10/2008 | Shah et al. | 705/14 |
| 2008/0313294 A1* | 12/2008 | Malone et al. | 709/206 |
| 2009/0012887 A1* | 1/2009 | Taub et al. | 705/34 |
| 2009/0055759 A1* | 2/2009 | Svendsen | 715/764 |
| 2009/0222907 A1* | 9/2009 | Guichard | 726/17 |
| 2009/0254836 A1* | 10/2009 | Bajrach | 715/745 |
| 2010/0010289 A1* | 1/2010 | Clare | 600/27 |
| 2010/0063830 A1* | 3/2010 | Kenedy et al. | 705/1 |
| 2010/0063835 A1* | 3/2010 | Kenedy et al. | 705/2 |
| 2010/0063843 A1* | 3/2010 | Kenedy et al. | 705/3 |
| 2010/0063865 A1* | 3/2010 | Kenedy et al. | 705/10 |
| 2010/0063930 A1* | 3/2010 | Kenedy et al. | 705/51 |
| 2010/0070292 A1* | 3/2010 | Kenedy et al. | 705/2 |
| 2010/0076950 A1* | 3/2010 | Kenedy et al. | 707/706 |
| 2010/0076988 A1* | 3/2010 | Kenedy et al. | 707/757 |
| 2010/0153453 A1* | 6/2010 | Knowles | 707/784 |
| 2010/0312852 A1* | 12/2010 | Kamga et al. | 709/217 |

* cited by examiner

SYSTEM, METHOD, AND COMPUTER PROGRAM FOR CREATING A GROUP PROFILE BASED ON USER PROFILE ATTRIBUTES AND A RULE

FIELD OF THE INVENTION

The present invention relates to user profiles, and more particularly to profiles of user groups.

BACKGROUND

Generally, user profiles have been utilized for customizing content presented to users associated with the user profiles. For example, user profiles have generally been used by content providers for identifying, creating, presenting, etc. content relevant to the users, such that the relevant content may be presented to the users and/or such that a session where the content is presented to the user may be tailored to the particular user (or group of users) in a manner that maximizes the intentional user experience. Unfortunately, traditional techniques for using user profiles to customize content and/or a content consumption session have exhibited various limitations when the customization is for a group of users.

There is thus a need for addressing these and/or other issues associated with the prior art.

SUMMARY

A system, method, and computer program product are provided for creating a group profile based on user profile attributes and a rule. In use, a plurality of user profiles is identified. Furthermore, a group profile is created based on attributes of the user profiles and at least one rule.

DETAILED DESCRIPTION

Figure 1:
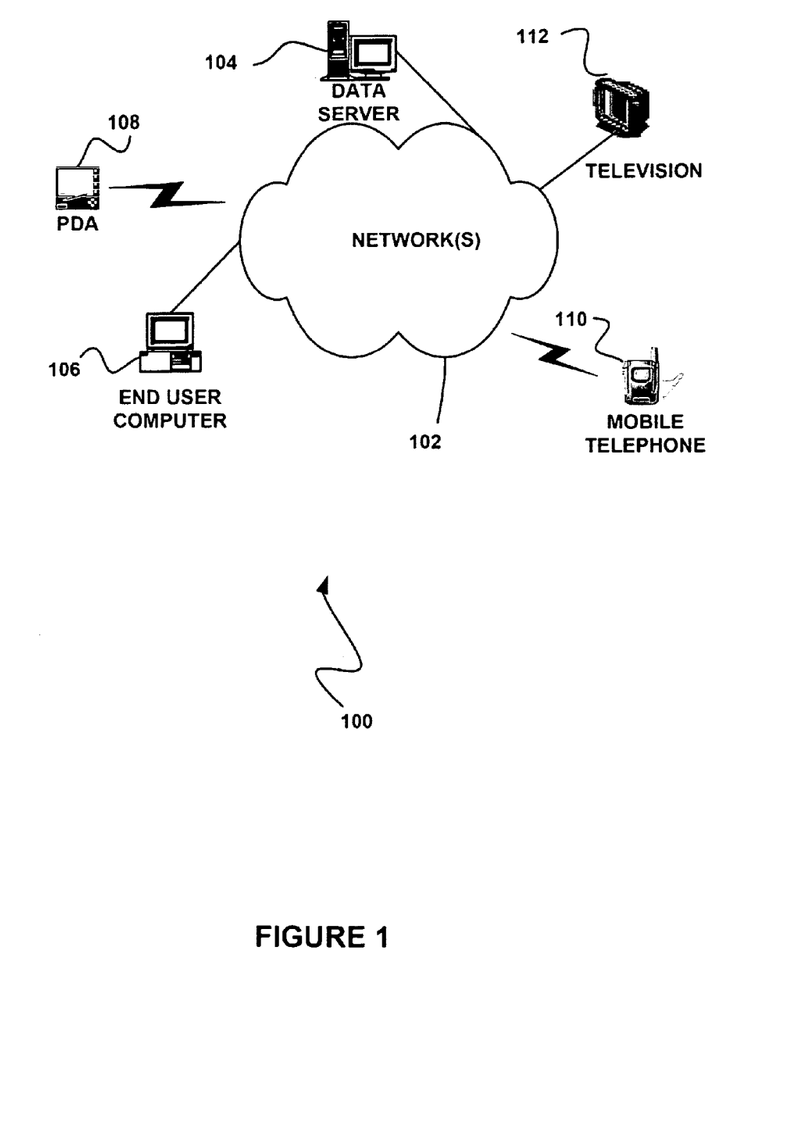
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
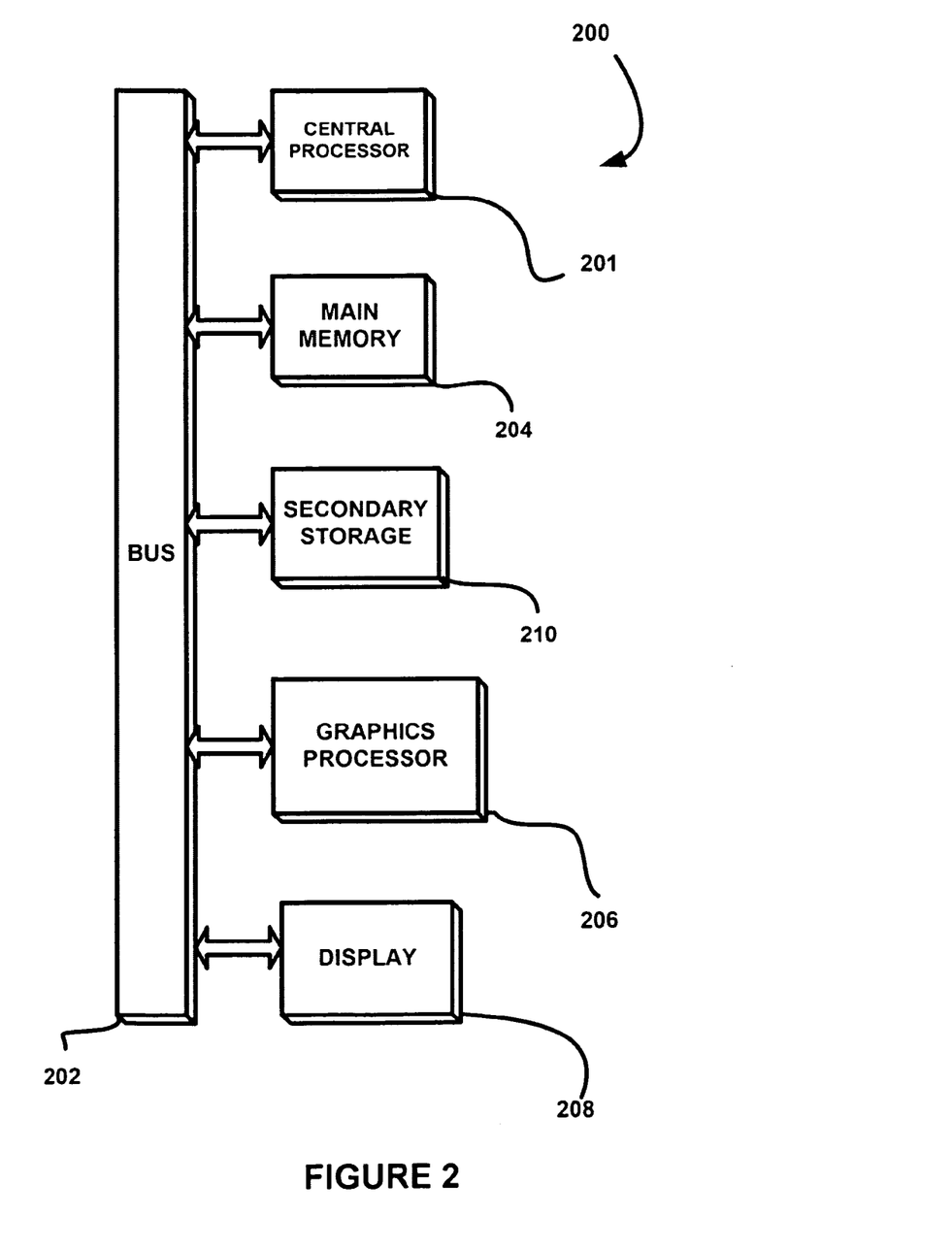
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
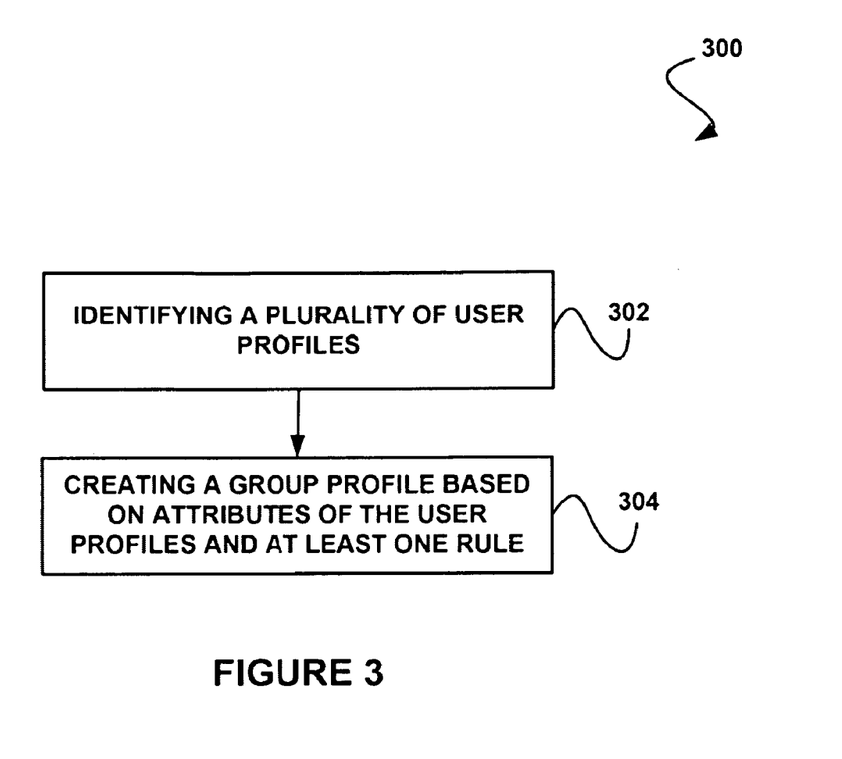
FIG. 3 illustrates a method for creating a group profile based on user profile attributes and a rule, in accordance with one embodiment.

FIG. 3 illustrates a method 300 for creating a group profile based on user profile attributes and a rule, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of user profiles is identified. With respect to the present description, each of the user profiles may include any data that profiles a particular user. Thus, each of the user profiles may include a profile of a different user. It should be noted that each user may be associated with a single user profile, or may optionally be associated with multiple user profiles (e.g. depending on the content/service provider generating the user profiles, etc.). Further, as an option, the user profiles may be stored in a database of user profiles.

Additionally, the user profiles may each include a single user attribute or a set of user attributes (e.g. attributes specific to a user associated with the user profile). As an option, a portion of a user profiles or the entire user profile may be accessible to an associated user. For example, the user may have predefined permissions (e.g. as a defined by an administrator user profile, described in more detail below, etc.) to view, save, change, and/or delete the user attributes (e.g. values of the user attributes). In various embodiments, as described below, the user attributes may include static attributes (e.g. a date of birth, gender, education level, etc.) or dynamic attributes (e.g. a location of the user, a purchase history of the user, a content viewing history of the user, preferences of the user, etc.).

In one embodiment, the user attribute may include demographic data. The demographic data may include a geographic location of a user associated with the user profile (e.g. a current geographic location, a home geographic location, etc.), a gender of the user, an age of the user, an education level of the user, and/or any other personally identifying information associated with the user.

In another embodiment, the user attribute may include a content customization setting, such as a configuration option. The content customization setting may include a setting for controlling content presented to the user. For example, the configuration option may control the customization of entertainment content (e.g. video, etc.) presented to the user, electronic commerce (eCommerce) content presented to the user, etc. In one exemplary embodiment, the configuration option may control customization of a graphical user interface (GUI), such as a television electronic program guide (EPG).

As an option, the content customization setting may only be utilized to customize content if the user profile including the content customization setting is active (e.g. if a user associated with the user profile has logged in to a system providing the content, etc.). In various embodiments, the content customization setting may provide easier access to content (e.g. easy channel swapping by grouping selective channels of the viewer together for simplified navigation among such channels), a credit limit setting, content filtering (e.g. parental controls), customized/personalized taste management (e.g. which may be enabled to rate content and/or receive a recommendation on content based on previous ratings provided by the user), a campaign targeted to the user, opt-in and opt-out controls for certain advertisement types (e.g. such as customizing the timing and scheduling of the display of advertisements), games which provide scores (e.g. providing points to the user for various activities), access to other specified users (e.g. that are participating in an entertainment or eCommerce session with the user), etc.

In yet another embodiment, the user attribute may include psychographic data, such as interests, attitudes, and/or opinions of the user. In still yet another embodiment, the user attribute may include a behavior history of the user (e.g. purchasing behavior, content viewing behavior, etc.). Optionally, the psychographic data and/or behavior history of the user may be determined based on historical information [e.g. user television viewing habits that may be learned by maintaining historical data (e.g. gathered via an IP television), such as the television channels or networks and types of programs the user has most frequently watched, time of viewing, duration of viewing, duration of programs viewed, etc. on the user] and an analysis of such historical information. In another embodiment, the user attribute may include a creditor payment history of the user.

In another embodiment, the user attribute may include a user category. The user category may include predefined category in which the user is classified. In various optional embodiments, the user category may include professional achievers, early adopters and trend setters, highly involved consumer whose communications needs are geared toward fulfilling social goals while adding fun to their lives, significant users of communications products and services which show a low level of engagement in technology purchases and have a functional attitude toward products and services, practical people driven by basic needs who have a low level of engagement in technology-purchasing decisions (e.g. who are more concerned about functionality, and do not view brand, design and style of products to be important), typically late adopters of technology (e.g. driven by basic, functional needs, and who view telecom products merely as tools for communications), low-income entry-level consumers whose level of engagement stops once basic needs are met (e.g. who have a lower income level, but a moderate level of education, who may be at an older-end of an age range), people who are driven by basic needs that are predominately work-related and who are moderately engaged buyers of technology products and services (e.g. this category may include the highest percentage of parents with children living at home, and may include a significant proportion of blue-collar workers), etc.

In other various embodiments, the user category may include a mix category (e.g. a collection of hipster young singles and couples, students and professionals, mobile urbanites, early adopters who are quick to check out the latest movie or nightclub), affluent and tech-savvy professionals, the wealthiest consumers, people with advanced degrees and sophisticated tastes, immigrants and descendants of multicultural backgrounds, etc.

Still yet, the user attribute may include a user preference. The user preference may include likes and dislikes determined based on input of the user. Optionally, the user preference may be based on a time of day (e.g. may change with the time of day). While various examples of user attributes have been described hereinabove, it should be noted that the user attribute may include any information capable of being included in a user profile.

In one embodiment, the user profiles may be stored in a database. Optionally, the database may be accessible may a single content provider or a plurality of content providers. Accordingly, the content provider(s) may access the user profiles and utilized such user profiles for customizing content provided to associated users, for example. Various embodiments of such content customization will be described in more detail below.

In another embodiment, each of the user attributes may include a consent flag. The consent flag may be set by the user associated with the user attribute, for example. As an option, the consent flag may indicate whether the user attribute with which it is associated is allowed to be shared with a third party (e.g. an advertiser, etc.), with users associated with other user profiles, etc.

As an option, each household may have at least one user profile. For example, each household may have at least an administrator (e.g. master) user profile that can set permissions (e.g. content customization settings) for other user profiles associated with the household. As another example, the administrator user profile may be capable of copying, deleting, and/or updating the user profiles associated with the household. In one embodiment, the administrator user profile may include a default user profile for the household. In another embodiment, the administrator user profile may set another user profile as the default user profile.

Moreover, the user profiles may be identified in any desired manner. In one embodiment, the user profiles may be identified for a single session that is established at a certain time and torn down at a later time). For example, the single session may include an entertainment session. The entertainment session may include a semi-permanent interactive exchange of entertainment content between an entertainer and at least one user. For example, the entertainment session may include a user viewing, and optionally interacting with, television content (e.g. a television commercial), listening to, and optionally interacting with, radio content (e.g. a radio commercial), viewing a movie in a movie theater, viewing a play, viewing a sport event or other culture event (e.g. where the event players may be also tuned to feedback of the viewer), participating in a video game, accessing web pages over the Internet, utilization of an interactive global positioning system (GPS), interacting with a mobile telephone, etc.

As another example, the single session may include an eCommerce session. The eCommerce session may include a semi-permanent interactive exchange of information for the purpose of buying and selling of products or services over electronic systems. Optionally, the eCommerece session may occur within or adjacent to an entertainment session. Of course, however, the single session may include any activity capable of being performed by a user with respect to content.

In another embodiment, the user profiles may include profiles of users participating in the single session. Just by way of example, the user profiles may be associated with users viewing entertainment content, performing a transaction via an eCommerce website, etc. To this end, the user profiles may optionally be associated with a group of users jointly (e.g. simultaneously) participating in a single session.

Optionally, the user profiles may be of users physically located at a single location for jointly participating in the single session at the single location (e.g. users watching the same television at the same time), users that are located at remote locations for jointly participating in the single session in a virtual manner (e.g. via televisions at remote locations), or a combination thereof. As another option, the user profiles may be of users that are participating in the single session via an Internet Protocol (IP) television infrastructure, an IP multicast group, etc.

As a further option, each of the user profiles may be of a user that is aware of an existence of all other users in the session (e.g. a participation by each other with respect to the session), only some of the users in the session, or none of the users in the session. As still yet another option, each of the user profiles may be of a first user that has knowledge, or does not have knowledge, that at least one second user in the session has awareness of a participation of the first user in the session. Of course, while the users have been described above as those participating in a single session, it should be noted that the users may not necessarily be associated with a single session, but may optionally each be associated with a different session, or some may be associated with a single session while others are associated with different sessions, etc.

Further, each of the user profiles may be identified based on an activation thereof. In one embodiment, the user profiles may be identified in response to receipt of a manual entry by an associated user. The manual entry may include a user login to an entertainment and/or eCommerce end-device. The user login may include user identification (e.g. by a single selection of a predefined button on a universal television remote control, by a selection of any button of a television remote control personally and uniquely associated with the user, etc.) and/or authentication [e.g. by input of a password, by fingerprint detection (provided via a fingerprint reader on a television remote control that is able to differentiate between the household member fingerprints), etc.]. Optionally, an incentive may be provided to the user in return for the manual entry provided by the user, such as a coupon, free content, etc.

Optionally, the user login may include selection of one of the user profiles, such that the selected user profile may be identified. If a user profile is not selected, the default user profile may be automatically identified. In another embodiment, the user profiles may be identified in response to receipt of an automatic identification of the associated user, such as by a user entry (e.g. via a scan of a ticket) into a theater, stadium, etc. for participating in an entertainment and/or eCommerce session, etc. Of course, it should be noted that the user profiles may be identified in any desired manner.

As also shown, a group profile is created based on user attributes of the user profiles and at least one rule. Note operation 304. In the context of the present description, the group profile may include any data that profiles a group of users and that is created based on user attributes of the user profiles and at least one rule. In one embodiment, the group may include a set of users participating in a session. For example, the group profile may include a single group attribute, or a plurality of groups attributes, that is associated with each of the users in the group. To this end, the group profile may optionally represent attributes of a group (e.g. a group of users collectively participating in a session). Various examples of such groups attributes are described in more detail below.

In one embodiment, the group profile may be a combination of the identified user profiles. For example, the group profile may be dynamically created based on the identification of the user profiles. To this end, the group profile may dynamically change based on which user profiles are identified (e.g. which user profiles are associated with a session, etc.).

Just by way of example, users may optionally be able to login and logout as desired to a certain entertainment and/or eCommerce session through a specific edge device where they can be exposed to certain content products and commercials. When several user profiles are simultaneously active through a certain edge device, a group profile may automatically reflect the active user profiles. The assignment/departure of user profiles (of group members) to/from a particular group profile can be performed according to information provided by the users included in the group (e.g. during a registration process, after the registration process, etc.), deduced automatically by an entertainment and/or eCommerce system and/or collected in any other desired manner.

In another embodiment, users may be included in a group in a hierarchical manner. For example, there may be sub-groups within a group. Further, there may optionally be individual users that belong in the group, but that do not belong to one of the sub-groups. Accordingly, the group profile may include sub-group profiles representative of the profiles of users in the sub-groups, etc. As yet another option, the group profile may be associated with predetermined user profiles, such that all or only a portion of users of a group may optionally be participating in the entertainment and/or eCommerce session.

Furthermore, the rule based on which the group profile is created may include any desired rule capable of controlling creation of a group profile. In one embodiment, the rule may include a function. Optionally, the function may output a group attribute of the group profile. For example, the rule may output the group attribute of the group profile as a function of at least a portion of the user attributes of the identified user profiles. In this way, the output group attribute may form the group profile. It should be noted that such a function may be utilized for a plurality of different types of user attributes, such that a corresponding group attribute may be output for each of the different types of user attributes input into the function.

In one exemplary embodiment, a static user attribute of each of the user profiles may be input into a function of the group profile for calculating a group attribute (e.g. a preference of the group to a certain subject, such as content and/or a product). In another exemplary embodiment, a dynamic attribute of each of the user profiles may be input into the function for calculating a group attribute. As an option, the rule may apply a predetermined weight to user attributes of the user profiles utilized for creating (e.g. included in, aggregated in, etc.) the group profile. Just by way of example, if user profiles are for users participating in a single session, and if each user in the session is aware of other users in the session, then the function may multiply each dynamic user attribute by a factor that reflects the influence of the group participation in the session on the value of the dynamic user attribute of a particular user profile. As another example, the behavior and preferences of a user during a session in the context of a group that jointly participate in the session, when the user is aware of the participant of other members of his/her group, may be the same or different (e.g. more intense, less intense or even opposite) than the user's behavior in a similar session where the user participates alone.

In another embodiment, the group profile may include group attributes which are each an aggregate of common user attributes of the user profiles. Further, the rule may modify the group attributes based on at least one external event (e.g. a market situation, a panned social gathering, an unplanned social gathering, etc.). For example, the external event may modify a value of a group attribute (e.g. indicative of a group behavior) for a particular session and/or period of time during which the event occurred.

Optionally, the amount that the group attribute is modified may change over time. In one exemplary embodiment, a result of a sporting game (e.g. whether a particular team won or lost the sporting game) may be a basis for modification of a group attribute (e.g. a preference of the group for content associated with a team participating in the sporting game), etc. In this way, the nile may optionally be utilized for providing a group profile that accurately reflects the users included in the group. It should be noted that the rule may be included in a repository of rules capable of being utilized for creating the group profile, and may further optionally be updated as desired (e.g. may dynamically change).

In one embodiment, the group attribute may include group member roles (e.g. roles of members of the group). For example, the group attribute may indicate which user is associated with a parent role in a family group, a priest in a church community group, etc. In another embodiment, the group attribute may include a group member degree of loyalty (e.g. a degree of loyalty to the group).

In yet another embodiment, the group attribute may include group preferences (e.g. content, products, etc. preferred by the users included in the group). In still yet anther embodiment, the group attribute may indicate the extent at which the users in the group know each other (e.g. actual relationships between the users in the group), potential relationships and interaction between users in the group with respect to a session associated with the group (e.g. which may influence their behavior during the session), etc. In another embodiment, the group attribute may include content customization settings for the group.

In another embodiment, the group attribute may include group decision-making patterns. For example, the group decision-making patterns may indicate whether the group typically (e.g. more than a threshold amount of the time) converges on one opinion/decision or whether there are any opinions that are not resolved by the group. As another example, the group decision-making patterns may indicate a method used by the group for decision-making (e.g., are decisions made in a consensus fashion or a majority manner, does each user's opinion have the same weight, is there a user in the group that is more influential, an opinion leader, a maven, an expert, an authority on details of the subject matter at issue, such as a technologically educated person or a fashion expert, etc.). As an option, the group attribute indicative of the group decision-making patterns may be constructed based on another group attribute (e.g. roles of the users included in the group) and/or user attributes (e.g. characteristics) of the users included in the group.

It should be noted that the group attributes may be generated based on any desired information that is at least in part based on user attributes of the identified user profiles. For example, the group attributes may also be based on information provided by the users associated with the identified user profiles, such as information provided during a registration process or after such registration, information automatically deduced according to behavior patterns of the users, etc.

In one exemplary embodiment, the group attribute may indicate that a user with a parental role may make a decision on whether to purchase a certain item for their kid/family, but their kid may select the particular item. In another exemplary embodiment, the group attribute may indicate that when a user with a mom role takes part in the session there are more chances she will buy a product than when dad is also participating in the session. In yet another exemplary embodiment, the group attribute may indicate that a group including a plurality of users in a single family may be ready to complete an ordering of a family vacation package only after each of the users reviewed the family vacation package or when the users are all present together in a session.

In still yet another exemplary embodiment, the group attribute may indicate a particular medical procedure preferred by a user of the group, various options of medical procedures that are available and a preference of one of the medical procedures by a medical professional included in the group, etc. In another exemplary embodiment, the group attribute may indicate whether there are guests in a house of a user (e.g. and if a guest's user profile is known, it can also be utilized for creating the group profile). Optionally, the group attribute may also indicate that engagement with an advertisement may be different (better or worse) when the guest present in the session (e.g. which may be deduced according to a rule), so that relevant advertisement targeting can be applied (e.g. there may be more chance for a pizza order), as described in more detail below.

In one exemplary embodiment, a plurality of users may simultaneously login to an entertainment and/or eCommerce system (e.g. of an entertainment content and/or eCommerce content provider) through a specific edge device and implicitly (or explicitly) activate an associated user profile. Just by way of example, tickets for a show in a theater may be purchased in advance via a credit card and the credit card company or the sales office may provide the user profiles corresponding to the purchasers to the theater (e.g. the card holder profile may be known and additional ticket profiles may be either deduced or assembled at the purchase time). When the ticket purchasers attend the show, the group may be closed. To this end, a profile for the group may be created based on the profiles of the ticket purchasers.

It should be noted that there may not necessarily be any need to expose personally identifying information of the users in the group in order to create the group profile, but only the user attributes of the users that the users have flagged as allowed to be shared (e.g. via consent flag).

To this end, a group profile may be created based on user attributes of the identified user profiles and at least one rule. As an option, the group profile may be applied to a session associated with the group, content presented to at least some users included in the group, a user profile associated with a user in the group, etc. In one embodiment, the group profile may be applied based on at least one rule (e.g. in a repository of niles).

The rule may enable the session associated with the users, the content presented to the users, etc. to be presented in a manner for providing a more relevant user experience, easier access to content, improved user relationships, etc. Further, the rule may enable the session associated with the users, the content presented to the users, etc. to be presented in a manner for creating an incentive (e.g. providing customized content, session, etc.), such that users may reveal their actual presence by logging into an entertainment and/or eCommerce system using the associated user profile, users may refine their presence while collectively participating in a session (e.g. by assigning or departing of additional users), etc.

For example, in one embodiment, content (e.g. presented to at least some of the users associated with the user profiles, such as via the session) may be customized based on the group profile. The content may include a digital image, audio, video, a game, a coupon, a web page, an advertisement, etc. The customization may include configuring the content to be relevant to the group profile (e.g. at least one group attribute of the group profile).

As another example, the dynamic user attributes of each of the identified user profiles may be configured (e.g. modified, etc.) according to the group profile. For example, information regarding the user's behavior in the context of participation in the session together with other users included in the group may be utilized for setting a user attribute for the user. Such user attribute may be indicative of the user's behavior patterns, as an option. As yet another example, the session associated with the group may be customized to the users in the group, based on the group profile.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
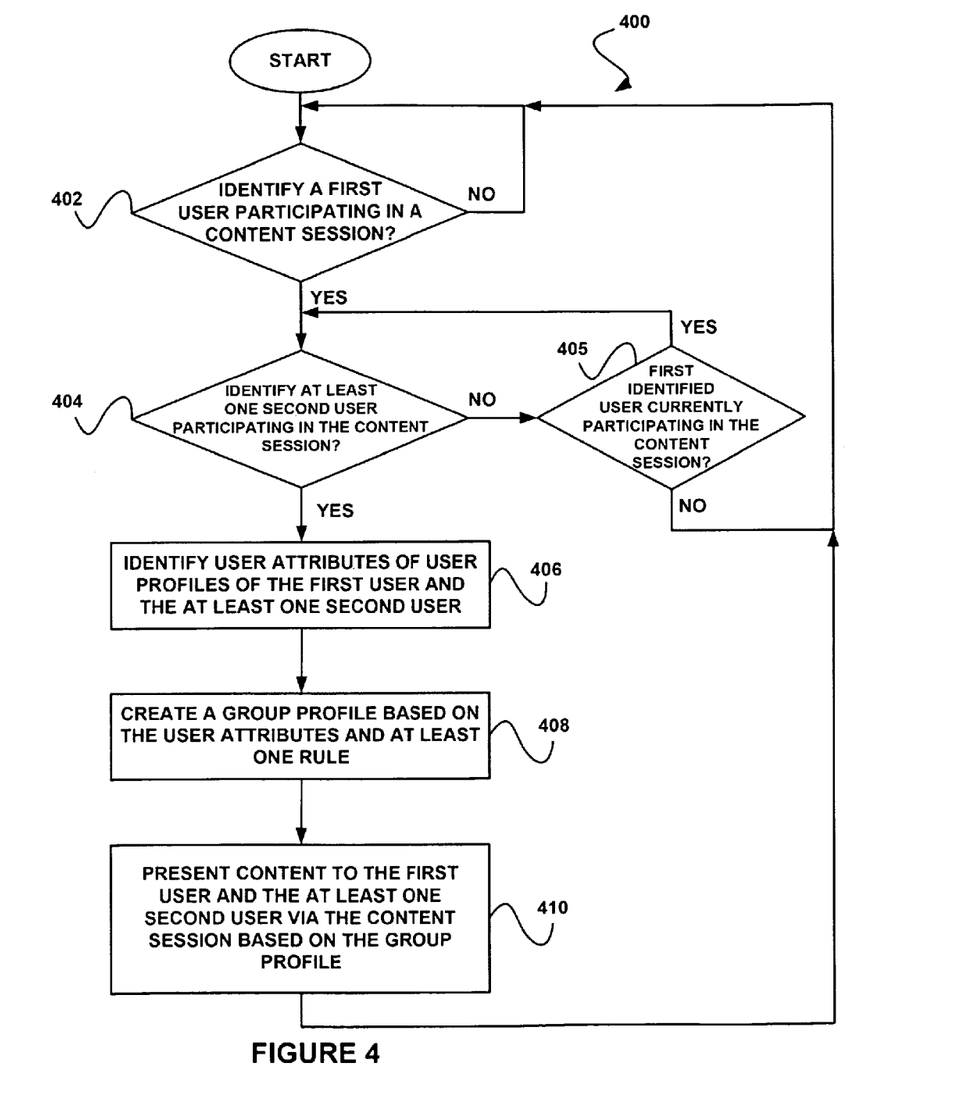
FIG. 4 illustrates a method for presenting content based on a group profile, in accordance with another embodiment.

FIG. 4 illustrates a method 400 for presenting content based on a group profile, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in decision 402, it is determined whether a first user is participating in a content session. The first user may include any user that is a first (e.g. initial) participant of the content session. With respect to the present embodiment, the content session may include an entertainment session and/or an eCommerce session. Optionally, it may be determined that the first user is participating in the content session by determining that the first user has provided a manual entry (e.g. has logged into the content session) or has automatically been identified (e.g. has attended a social gathering, such as watching a movie at a movie theater).

If it is determined that the first user is not participating in the content session, the method 400 continues to wait for the first user to participate in the content session. If, however, it is determined that the first user is participating in the content session, it is further determined whether at least one second user is participating in the content session. Note decision 404.

The second user may include any user other than the first user that is a participant of the content session. It should be noted that the second user may also be identified as participating in the content session by determining that the second user has provided a manual entry (e.g. has logged into the content session) or has automatically been identified (e.g. has attended a social gathering, such as watching a movie at a movie theater).

If it is determined that the second user is not participating in the content session, it is further determined whether the first identified user is still participating in the content session. Note decision 405. If it is determined that the first user is no longer participating in the content session, the method 400 continues to wait for a first user to participate in the content session. However, if it is determined that the first user is still participating in the content session, the method 400 continues to wait for the second user to participate in the content session. If it is determined that the second user is participating in the content session, user attributes of user profiles of the first user and the at least one second user are identified. Note operation 406. For example, each of the first user and the second user may be associated with a user profile, such that the user attributes thereof may be identified.

Additionally, a group profile is created based on the user attributes and at least one rule, as shown in operation 408. To this end, the group profile may include a profile for the first user and the second user. In one embodiment, the group profile may include a plurality of group attributes. The group attributes may include a combination of the user attributes, for example. As an option, the user attributes may be combined to form the group attributes as a function of the rule, may be modified (e.g. weighted) to form the group attributes based on the rule, etc.

Moreover, as shown in operation 410, content is presented to the first user and the at least one second user via the content session based on the group profile. The content may include video, audio, a digital image, an advertisement, products on an eCommerce webpage, etc. Further, the group profile may determined the content that is relevant to the first user and the second user, such that it may be ensured that relevant content is presented to such first user and second user. Just by way of example, if the session includes an eCommerce provided via an eCommerce web page, the content may include the eCommerce web page which has been modified to include products relevant to the first user and the second user, as determined based on the group profile.

Still yet, after the content is presented to the first user and the at least one second user via the content session based on the group profile (in operation 410), the method 400 again determines whether a first user (which is not necessarily the same first user previously identified in decision 402) is participating in a content session. It should be noted that such content session may be the same or different content session than the content session in which the previously identified first user participated. In this way, content sessions may be continuously monitored for participation by multiple users, such that the content sessions may be utilized for presenting content based on a group profile created for the multiple users.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program, comprising:
   computer code for identifying a single session;
   computer code for identifying a group of users participating in the identified single session;
   computer code for identifying a user profile of each of the users in the group, where each user profile contains one or more user attributes specific to the user associated with the user profile, and where the user attributes of the user profile includes at least one of demographic data, psychographic data, purchasing behavior, a user category, user preferences, and content customization settings; and
   computer code for creating a single group profile that is associated with each of the users in the group, wherein the single group profile is created to include at least one group attribute determined based on the user attributes of the identified user profiles and at least one rule, where the at least one rule outputs the at least one group attribute to the group profile as a function of at least a portion of the user attributes of the identified user profiles;

wherein the at least one rule multiplies each of the attributes in the at least the portion of the user attributes of the identified user profiles by a factor that reflects an influence of a participation of the plurality of users in the single session on a value of each of the attributes in the at least the portion of the user attributes of the identified user profiles.

2. The computer program of claim 1, wherein the single session includes one of an entertainment session and an electronic transaction session.

3. The computer program of claim 1, wherein each of the user profiles is identified in response to a receipt of a manual entry by an associated user or in response to an automatic identification of the associated user.

4. The computer program of claim 1, wherein each of the user attributes includes a consent flag.

5. The computer program of claim 4, wherein the consent flag indicates whether an associated one of the user attributes is allowed to be shared with a third party.

6. The computer program of claim 4, wherein the consent flag indicates whether an associated one of the user attributes is allowed to be shared with users associated with the user profiles.

7. The computer program of claim 1, wherein the at least one rule includes a function.

8. The computer program of claim 7, wherein the function outputs the at least one group attribute of the group profile.

9. The computer program of claim 1, wherein the group profile includes a plurality of group attributes.

10. The computer program of claim 9, wherein the group attributes include at least one of group member roles, group member degree of loyalty, group preferences, group decision-making patterns, and content customization settings.

11. The computer program of claim 1, further comprising computer code for customizing content, based on the group profile.

12. The computer program of claim 11, wherein the content includes at least lone of a digital image, audio, video, and an advertisement.

13. The computer program of claim 11, further comprising computer code for presenting the content to users associated with the user profiles.

14. The computer program of claim 1, wherein the group profile includes a combination of the identified user profiles.

15. The computer program of claim 1, wherein the group profile includes one or more sub-group profiles representative of the user profiles in one or more sub-groups.

16. The computer program of claim 1, wherein the group profile is dynamically changed based on which users are identified as participating in the identified single session, such that the group profile is dynamically changed using the user profiles of the users that are identified as participating in the identified single session.

17. The computer program of claim 1, wherein the at least one group attribute included in the group profile is an aggregate of common user attributes of the user profiles.

18. The computer program of claim 1, wherein the rule further outputs the at least one group attribute to the group profile as a function of at least one external event including one of a market situation, a planned social gathering, and an unplanned social gathering.

19. A method, comprising:
identifying a single session;
identifying a group of users participating in the identified single session;
identifying a user profile of each of the users in the group, where each user profile contains one or more user attributes specific to the user associated with the user profile, and where the user attributes of the user profile includes at least one of demographic data, psychographic data, purchasing behavior, a user category, user preferences, and content customization settings; and
creating a single group profile that is associated with each of the users in the group, wherein the single group profile is created to include at least one group attribute determined based on the user attributes of the identified user profiles and at least one rule, where the at least one rule outputs the at least one group attribute to the group profile as a function of at least a portion of the user attributes of the identified user profiles;
wherein the at least one rule multiplies each of the attributes in the at least the portion of the user attributes of the identified user profiles by a factor that reflects an influence of a participation of the plurality of users in the single session on a value of each of the attributes in the at least the portion of the user attributes of the identified user profiles.

20. A system, comprising:
a processor for:
identifying a single session;
identifying a group of users participating in the identified single session;
identifying a user profile of each of the users in the group, where each user profile contains one or more user attributes specific to the user associated with the user profile, and where the user attributes of the user profile includes at least one of demographic data, psychographic data, purchasing behavior, a user category, user preferences, and content customization settings; and
creating a single group profile that is associated with each of the users in the group, wherein the single group profile is created to include at least one group attribute determined based on the user attributes of the identified user profiles and at least one rule, where the at least one rule outputs the at least one group attribute to the group profile as a function of at least a portion of the user attributes of the identified user profiles;
wherein the at least one rule multiplies each of the attributes in the at least the portion of the user attributes of the identified user profiles by a factor that reflects an influence of a participation of the plurality of users in the single session on a value of each of the attributes in the at least the portion of the user attributes of the identified user profiles.

21. The system of claim 20, wherein the processor is coupled to memory via a bus.

* * * * *

UNITED STATES PATENT AND TRADEMARK OFFICE
CERTIFICATE OF CORRECTION

PATENT NO. : 8,316,020 B1
APPLICATION NO. : 12/331142
DATED : November 20, 2012
INVENTOR(S) : Amit Kleinmann It is certified that error appears in the above-identified patent and that said Letters Patent is hereby corrected as shown below:

In the claims:
Claim 12, col. 11, line 41; please replace "lone" with --one--.

Signed and Sealed this
Nineteenth Day of March, 2013

Teresa Stanek Rea
*Acting Director of the United States Patent and Trademark Office*